(12) United States Patent
Kreisfeld et al.

(10) Patent No.: US 10,801,862 B2
(45) Date of Patent: Oct. 13, 2020

(54) DEVICE AND METHOD FOR DETERMINING THE WEAR STATE OF A CHAIN

(71) Applicant: iwis antriebssysteme GmbH & Co. KG, Munich (DE)

(72) Inventors: Peter Kreisfeld, Winkelhaid (DE); Florian Madlener, Fürstenfeldbruck (DE); Josef Siraky, Donaueschingen (DE); Thomas Wolf, Munich (DE)

(73) Assignee: IWIS ANTRIEBSSYSTEME GMBH & CO. KG, Munich (DE)

( * ) Notice: Subject to any disclaimer, the term of this patent is extended or adjusted under 35 U.S.C. 154(b) by 113 days.

(21) Appl. No.: 16/134,694

(22) Filed: Sep. 18, 2018

(65) Prior Publication Data

US 2019/0086239 A1    Mar. 21, 2019

(30) Foreign Application Priority Data

Sep. 19, 2017   (DE) .................. 10 2017 121 706

(51) Int. Cl.
*G01D 5/20*     (2006.01)
*G01N 27/83*    (2006.01)
(Continued)

(52) U.S. Cl.
CPC .................. *G01D 5/20* (2013.01); *G01B 7/24* (2013.01); *G01M 5/0025* (2013.01);
(Continued)

(58) Field of Classification Search
CPC ......... G01D 5/20; G01B 7/24; G01M 5/0025; G01M 13/023; G01N 27/72; G01N 27/83
(Continued)

(56) References Cited

U.S. PATENT DOCUMENTS 5,291,131 A  *  3/1994  Suzuki ................. G01B 7/042
                                               324/206
6,344,741 B1 *  2/2002  Giguere .............. G01N 17/006
                                               324/225
(Continued)

FOREIGN PATENT DOCUMENTS

DE      102 45 323         4/2004
DE      10245323 A1 *      4/2004  ............. F16G 13/02
(Continued)

OTHER PUBLICATIONS

German Search Report dated Feb. 2, 2018 by the German Patent Office in German Application No. 10 2017 121 706.1.
(Continued)

*Primary Examiner* — Patrick Assouad
*Assistant Examiner* — Sean Curtis
(74) *Attorney, Agent, or Firm* — Henry M. Feiereisen LLC

(57) ABSTRACT

A chain sensor includes a first magnetic circuit, a device for measuring the magnetic flux density in the first magnetic circuit, and a coil. The magnetic circuit is substantially formed by a magnetically conductive yoke body. The yoke body has a lateral leg, the end of which is disposable in the proximity of a chain. The device for measuring the magnetic flux density is connected to an analysis unit. To determine the elongation of the chain during operation, a partially closed magnetic circuit is formed, a voltage is applied to a coil disposed in the magnetic circuit, an alternating magnetic flux density is generated in the magnetic circuit by the movement of the chain through the partially closed magnetic circuit, the alternating magnetic flux density in the magnetic circuit is detected as a plurality of measured values, and a length value of the chain from the measured values is determined.

16 Claims, 9 Drawing Sheets

(51) Int. Cl.
*G01M 5/00* (2006.01)
*G01B 7/24* (2006.01)
*G01M 13/023* (2019.01)
*G01N 27/72* (2006.01)

(52) U.S. Cl.
CPC ......... *G01M 13/023* (2013.01); *G01N 27/72* (2013.01); *G01N 27/83* (2013.01)

(58) Field of Classification Search
USPC .......................................... 324/200–207.26
See application file for complete search history.

(56) References Cited

U.S. PATENT DOCUMENTS

| | | | | |
|---|---|---|---|---|
| 7,540,374 | B2* | 6/2009 | Rathbun | B65G 43/02 198/502.1 |
| 7,814,800 | B2* | 10/2010 | Roovers | B62M 6/50 73/760 |
| 7,896,766 | B2* | 3/2011 | Mitzschke | B65G 17/086 198/850 |
| 8,550,236 | B2* | 10/2013 | Merten | B65G 23/44 198/810.04 |
| 9,359,146 | B2* | 6/2016 | Salice | B65G 43/02 |
| 9,533,829 | B2* | 1/2017 | Teuber | B65G 17/32 |
| 9,541,160 | B2* | 1/2017 | Kranz | F16G 13/20 |
| 9,671,251 | B2* | 6/2017 | Siraky | G01D 5/2013 |
| 9,897,180 | B2* | 2/2018 | Hartinger | F16H 19/0645 |
| 2009/0120211 | A1* | 5/2009 | Roovers | G01L 5/13 73/862.474 |
| 2010/0102807 | A1* | 4/2010 | Yoshioka | G01N 27/83 324/240 |
| 2011/0024268 | A1* | 2/2011 | Merten | E21F 13/066 198/810.01 |
| 2014/0156221 | A1* | 6/2014 | Bertolotti | G01D 5/2457 702/151 |
| 2014/0236348 | A1* | 8/2014 | Salice | B65G 43/02 700/230 |
| 2015/0226582 | A1* | 8/2015 | Siraky | G01M 13/00 324/207.15 |
| 2019/0086239 | A1* | 3/2019 | Kreisfeld | G01D 5/20 |

FOREIGN PATENT DOCUMENTS

| | | | | |
|---|---|---|---|---|
| DE | 10245323 | B4 * | 8/2006 | ............... B65H 9/12 |
| DE | 102017121706 | A1 * | 3/2019 | ............ G01B 7/24 |
| EP | 1 464 919 | | 10/2004 | |
| EP | 1464919 | A1 * | 10/2004 | ............ G01B 7/046 |
| EP | 2910 904 | | 8/2015 | |
| EP | 2910904 | A1 * | 8/2015 | .......... G01D 5/2013 |
| EP | 2910904 | B1 * | 6/2016 | .......... G01D 5/2013 |
| JP | 2009-210550 | | 9/2009 | |
| JP | 2009210550 | A * | 9/2009 | |
| WO | WO 2017/019425 | | 2/2017 | |
| WO | WO-2017019425 | A1 * | 2/2017 | ............... G01N 3/56 |
| WO | WO-2017019425 | A1 * | 2/2017 | .......... G01M 13/023 |

OTHER PUBLICATIONS

Translation of German Search Report dated Feb. 2, 2018 by the German Patent Office in German Application No. 10 2017 121 706.1.

\* cited by examiner

DEVICE AND METHOD FOR DETERMINING THE WEAR STATE OF A CHAIN

CROSS-REFERENCES TO RELATED APPLICATIONS

This application claims the priority of German Patent Application, Serial No. 10 2017 121 706.1, filed Sep. 19, 2017, pursuant to 35 U.S.C. 119(a)-(d), the disclosure of which is incorporated herein by reference in its entirety as if fully set forth herein.

BACKGROUND OF THE INVENTION

The present invention relates to a method for determining an elongation of a segment of a chain in a chain drive, to a sensor device for determining an elongation of a segment of a chain, to a chain, to a chain/sensor device system, and to a computer program for carrying out the method.

The following discussion of related art is provided to assist the reader in understanding the advantages of the invention, and is not to be construed as an admission that this related art is prior art to this invention.

Chain drives are used in a variety of industrial applications for driving or handling purposes. Frequently, several strands of chain are used. In addition to a usually endlessly revolving chain, a complete chain drive includes several chain sprockets which serve to return the chain, as well as drive or handling elements connected to the chain, which are actuated by the chain. Due to the abrasion occurring between parts in a chain joint movable against each other, a chain is subject to wear during operation. Additional factors, such as elongation at the chain inlet, stretching, bearing clearance and bearing abrasion, may also cause elongation of the chain and eventually failure of the drive unit. Further factors influencing the wear of a chain are the forces acting on the chain and loads, or even external influences defined by the surroundings. Due to the complexity of these conditions, it is not possible to predict the wear of a chain and thereby a possible fault within the operating process or even the failure of the drive unit.

Given the ever-growing number of fully automated machines and systems, complex chain drives are more and more widely used, as they are necessary for modern factory automation. Because of the high investment costs entailed by such a high degree of automation and the global price pressure, it is necessary to reduce downtimes of such machines and systems to an absolute minimum and completely prevent unplanned downtimes.

In addition to direct financial losses, such unplanned downtimes also lead to indirect issues such as disruptions in the logistics chain or even delivery periods which are impossible to meet and thus further financial damage. However, even a low degree of wear can lead to processes synchronized by chain drives causing production defects and having to be manually readjusted. As the wear of a drive chain or its elongation can neither be avoided nor determined in advance, continuous monitoring of a chain drive is indispensable to be able to perform timely inspections for adjusting the synchronized processes and replacing defective chains.

It would therefore be desirable and advantageous to address prior art shortcomings.

SUMMARY OF THE INVENTION

According to one aspect of the present invention, a chain sensor device includes a first chain sensor, the chain sensor including a first magnetic circuit including a first segment formed by a magnetically conductive yoke body which has a lateral leg, the lateral leg having an end for arrangement in a proximity of a chain, a device configured to measure a magnetic flux density in the first magnetic circuit and connected to an analysis unit, and a coil arranged at the end of the lateral leg for applying a voltage to the first magnetic circuit.

The present invention resolves prior art problems by providing a chain sensor which includes a first magnetic circuit substantially formed by a magnetically conductive yoke body. This magnetically conductive yoke body has a lateral leg, the end of which is disposable at a small distance from a chain substantially perpendicularly to the chain links of the chain to be monitored. This arrangement facilitates forming an essentially closed magnetic circuit within the magnetically conductive yoke body and chain. The chain sensor also has a device for measuring the magnetic flux density within the first magnetic circuit, which is connected to an analysis unit. The chain sensor of the invention is structured such that it has an electrically conductive coil in addition to the device for measuring the magnetic flux density. This electrically conductive coil generates a fluctuating magnetic field within the first magnetic circuit. The movement of the chain relative to the chain sensor changes the path of the lowest magnetic resistance of the first magnetic circuit with the varying thickness of the chain joints of the chain. Such changes depend on the length of the chain links of the chain and the chain's speed. The frequency of the fluctuating magnetic field generated by the electrically conductive coil may be considerably higher (by a factor of approximately 10) than the changes in the magnetic field generated by the movement of the chain relative to the chain sensor. The changes are measured by the device for measuring the magnetic flux density and analyzed by an analysis unit as well as output and/or displayed. In this manner, the operator of the chain can replace precisely the chain link or precisely the chain links exceeding a pre-determined elongation and thus wear. The prior-art solutions for assessing the wear state of a chain only establish an elongation of the entire chain. Therefore, replacement of the entire chain is necessary. With the chain sensor of the invention, the user does not only have a robust, simply structured and therefore inexpensive chain sensor available, but may also no longer have to replace the entire chain but only the chain links affected by wear. The maintenance of the chain is less time-consuming and costly than with prior solutions, the risk of downtimes or production losses is considerably reduced. The chain sensor of the invention may both be integrated into new chain systems and easily retrofitted into already existing systems.

Devices for measuring magnetic flux density include Hall effect sensors, fluxgate or second-harmonic detectors, stationary and rotating coils (induction), e.g. vibrating-sample magnetometers, optically pumped magnetometers, such as alkali vapor magnetometers (for example with atomic rubidium or cesium vapor), SQUIDs, proton magnetometers, such as Overhauser magnetometers, magnetometers based on Bose-Einstein condensates (BEC magnetometers) having a sensitivity of 10-9 k and a spatial resolution of 3 μm, and Kerr magnetometers.

According to another advantageous feature of the present invention, the coil can have a terminal via which an electrical voltage can be applied to the coil. The electrically conductive coil generates a fluctuating magnetic field within the first magnetic circuit. The frequency of the fluctuating magnetic field generated by the electrically conductive coil is considerably higher (by a factor of approximately 10) than the changes in the magnetic field generated by the movement of the chain relative to the chain sensor. Prior-art chain sensors using permanent magnets require a minimum speed of the chain to be monitored to obtain calculable signal strengths. When staying below this minimum speed, chain links cannot be detected by the chain sensor and, therefore, their elongation cannot be determined. The fluctuating magnetic field ensures that signal strengths sufficient for analysis are generated for each chain link even at the lowest speed of the chain to be monitored.

According to another advantageous feature of the present invention, the magnetically conductive yoke body can have a central leg and two lateral legs.

Advantageously, the magnetically conductive yoke body of the chain sensor according to the invention can be structured such that it has a leg substantially extending in parallel to the chain and two lateral legs angled towards the chain. The ends of the lateral legs are located at a small distance from the chain.

According to another advantageous feature of the present invention, the lateral legs of the magnetically conductive yoke body can be angled such that they exhibit such a large distance from each other that they face different chain links of a chain located at a small distance. Each lateral leg is oriented towards the same part of a chain link, e.g. the same protrusions, gaps or the like. Thus, the distance of the lateral legs is an integer multiple of a chain link of a new, non-worn chain. The first magnetic circuit has, in a further embodiment of the invention, a second magnetic yoke body disposed beyond the first magnetic yoke body at the opposite side of a chain. Based on this arrangement, the first magnetic circuit comprises the first and second magnetic yoke bodies and the chain.

In a further embodiment of the invention, the second magnetically conductive yoke body can be designed such that the device for measuring the magnetic flux density and/or the coil is disposed thereon. For proper operation of the chain sensor it is not relevant to which of the two yoke bodies the coil and measuring device are attached. Typically, the first magnetically conductive yoke body is disposed above the chain to be monitored, the second underneath it. Structural and spatial circumstances, e.g. of the power supply lines in the area of the chain to be monitored, may require a power connection of the chain sensor at the lower second or upper first yoke body.

According to another advantageous feature of the present invention, the chain sensor can have a second magnetic circuit. Using this second magnetic circuit, the direction of movement and speed of the chain to be monitored can be established in addition to the elongation of individual chain links. Therefore, the user may at any time monitor whether the chain is moving at the desired speed into the desired direction.

The second magnetic circuit can have a same structure as the first magnetic circuit: a magnetically conductive yoke body has a lateral leg, the end of which is disposable in the proximity of a chain. The chain and magnetically conductive yoke body form a magnetic circuit.

According to another advantageous feature of the present invention, the second magnetic circuit can have a device for measuring the magnetic flux density and an electrically conductive coil. This electrically conductive coil has a terminal via which an electrical voltage can be applied to the electrically conductive coil. The electrically conductive coil generates a fluctuating magnetic field within the second magnetic circuit. The frequency of the fluctuating magnetic field generated by the electrically conductive coil is considerably higher (by a factor of approximately 10) than the changes in the magnetic field generated by the movement of the chain relative to the chain sensor. The prior-art chain sensors using permanent magnets require a minimum speed of the chain to be monitored to obtain calculable signal strengths. When staying below this minimum speed, changes in the magnetic field strength caused by the chain links cannot be detected by the chain sensor and, therefore, the elongation of the chain links cannot be determined. The fluctuating magnetic field ensures that signal strengths sufficient for analysis are generated for each chain link even at the lowest speed of the chain to be monitored.

According to another advantageous feature of the present invention, the two magnetic circuits of the chain sensor can be disposed at a distance from each other. The distance is dimensioned such that the end of the lateral leg of the magnetically conductive yoke of the second magnetic circuit is oriented towards both a different chain link and a different part of a chain link than the end of the lateral leg of the magnetically conductive yoke of the first magnetic circuit. For example, if the end of the magnetically conductive yoke of the first magnetic circuit points towards a hole of a chain link, the end of the magnetically conductive yoke of the second magnetic circuit points towards an area next to the hole of a chain link.

According to another advantageous feature of the present invention, the end of the lateral leg of the magnetically conductive yoke body of the first magnetic circuit can be disposed at a distance from an end of a lateral leg of a magnetically conductive yoke body of the second magnetic circuit, the distance being $$d = n*g + \Delta \qquad (1)$$

with
 d being the distance
 n being an integer,
 g being a length of a chain link, and
 $\Delta > 0.1*g$, preferably $\Delta > 0.2*g$ and more preferably $\Delta > 0.3*g$.

These arrangements provide both magnetic circuits with different signals of the changes in magnetic field strength caused by the chain to be monitored. The signals are within a defined time interval from each other, deviations from which are used for analysis. Thus, monitoring of the speed and direction of movement is possible in addition to monitoring the elongation of chain links.

According to another advantageous feature of the present invention, the second magnetic circuit can include a magnetically conductive yoke and a second coil which is disposed at a lateral leg of the magnetically conductive yoke, the second coil having a terminal via which an electrical voltage can be applied to the electrically conductive coil. Analogously to the first magnetic circuit, the electrically conductive coil generates a fluctuating magnetic field within the second magnetic circuit. The frequency of the fluctuating magnetic field generated by the electrically conductive coil is considerably higher (by a factor of approximately 10) than the changes in the magnetic field generated by the movement of the chain relative to the chain sensor.

Advantageously, the lateral legs of the magnetically conductive yoke body of the first magnetic circuit and the lateral legs of the magnetically conductive yoke body of the second magnetic circuit can be disposed at the same yoke body. Due to this arrangement, the chain sensor of the invention has a very compact structure and very low manufacturing costs.

Moreover, in this embodiment, it can be easily integrated or retrofitted into existing conveying systems.

According to another advantageous feature of the present invention, the first magnetic circuit and the second magnetic circuit of the chain sensor can be embodied such that they have a common circuit section.

According to another advantageous feature of the present invention, the electrically conductive coil and/or the device for measuring the magnetic flux density can be disposed at the common circuit section of the first and second magnetic circuits.

According to another advantageous feature of the present invention, the chain sensor can have a third magnetic circuit. Using this third magnetic circuit, the elongation of the individual chain links can be monitored, the speed and direction of movement of the chain to be monitored can be established and, additionally, the acceleration of the chain to be monitored can be determined. The user can also establish whether the chain to be monitored is accelerated or decelerated.

Advantageously, the third magnetic circuit can have same structure as the first and second magnetic circuits: a magnetically conductive yoke body possesses a lateral leg, the end of which is disposable in the proximity of a chain. The chain and magnetically conductive yoke body form a magnetic circuit.

According to another advantageous feature of the present invention, the third magnetic circuit can have a device for measuring the magnetic flux density. This device is connected to an analysis unit and measures the changes in the magnetic field generated by the movement of the chain relative to the chain sensor. These changes are analyzed by the analysis unit and output and/or displayed. Due to this arrangement, the user is always informed about the elongation of the chain links, the speed and direction of movement and the acceleration of the chain to be monitored.

According to another advantageous feature of the present invention, the third magnetic circuit can have a device for measuring the magnetic flux density and an electrically conductive coil. This electrically conductive coil has a terminal via which an electrical voltage can be applied to the electrically conductive coil. The electrically conductive coil generates a fluctuating magnetic field within the third magnetic circuit. The frequency of the fluctuating magnetic field generated by the electrically conductive coil is considerably higher than the changes in the magnetic field generated by the movement of the chain relative to the chain sensor. Known chain sensors require a minimum speed of the chain to be monitored to obtain calculable signal strengths. When staying below this minimum speed, changes in the magnetic field strength caused by the chain links cannot be detected by the chain sensor. The fluctuating magnetic field ensures that signal strengths sufficient for analysis are generated for each chain link even at the lowest speed of the chain to be monitored.

Advantageously, the three magnetic circuits of the chain sensor can be disposed at a distance from each other. The distance is dimensioned such that the end of the lateral leg of the magnetically conductive yoke of the third magnetic circuit is oriented towards both a different chain link and to a different part of a chain link than the end of the lateral leg of the magnetically conductive yoke of the second magnetic circuit. The end of the lateral leg of the magnetically conductive yoke of the second magnetic circuit is also oriented towards both a different chain link and a different part of a chain link than the end of the lateral leg of the magnetically conductive yoke of the first magnetic circuit. All of the three lateral legs of the magnetic yokes of the three magnetic circuits are oriented towards different chain links of the chain to be monitored and, at the same time, towards different areas of a chain link.

According to another advantageous feature of the present invention, the end of the lateral leg of the magnetically conductive yoke of the first magnetic circuit is disposed at a distance from an end of a lateral leg of a magnetically conductive yoke of the second magnetic circuit, the distance being $$d_1 = n_1 * g + \Delta_1 \quad (2)$$

with
$d_1$ being the distance,
$n_1$ being an integer,
g being a length of a chain link, and
$\Delta_1 > 0.1 * g$, preferably $\Delta_1 > 0.2 * g$ and more preferably $\Delta_1 > 0.3 * g$,
and wherein the end of the lateral leg of the magnetically conductive yoke of the first magnetic circuit is disposed at a distance from an end of a lateral leg of a magnetically conductive yoke of the third magnetic circuit, the distance $d_2$ being $$d_2 = n_2 * g + \Delta_2 \quad (3)$$

with
$d_2$ being the distance,
$n_2$ being an integer,
g being the length of a chain link, and
$\Delta_2 > 0.1 * g$, preferably $\Delta_2 > 0.2 * g$ and more preferably $\Delta_2 > 0.3 * g$, wherein $\Delta_1 \neq \Delta_2$.

This arrangement provides both magnetic circuits with signals in a different time sequence of the changes in magnetic field strength caused by the chain to be monitored. Thus, monitoring the acceleration, speed and direction of movement is possible in addition to monitoring the elongation of the chain links.

According to another advantageous feature of the present invention, a third electrically conductive coil can be disposed at the lateral leg of the magnetically conductive yoke of the third magnetic circuit of the chain sensor. This electrically conductive coil has a terminal via which an electrical voltage can be applied to the electrically conductive coil. Analogously to the first and second magnetic circuits, the electrically conductive coil generates a fluctuating magnetic field within the third magnetic circuit. The frequency of the fluctuating magnetic field generated by the electrically conductive coil is again considerably higher than the changes in the magnetic field generated by the movement of the chain relative to the chain sensor.

Advantageously, all of the lateral legs of the magnetically conductive yoke body of the three magnetic circuits are disposed at the same yoke body. Due to this arrangement, the chain sensor of the invention has a very compact structure and very low manufacturing costs. Moreover, in this embodiment, it can be easily integrated or retrofitted into existing conveying systems.

Advantageously, the first magnetic circuit, the second magnetic circuit and the third magnetic circuit of the chain sensor can be embodied such that they have a common circuit section.

Advantageously, the electrically conductive coil and/or the device for measuring the magnetic flux density can be disposed at the common circuit section of the first, second and third magnetic circuits.

According to another advantageous feature of the present invention, the chain sensor device can include two chain sensors, each having two magnetic circuits. The second chain sensor increases the accuracy of the measurement of the elongation of the chain links, the speed and direction of movement of the chain to be monitored and may optionally be used as a reserve in the event the first chain sensor fails.

The two chain sensors can be disposed at a distance from each other. The end of the lateral leg of the magnetically conductive yoke of the second magnetic circuit of the first chain sensor is oriented towards both a different chain link and a different part of a chain link than the end of the lateral leg of the magnetically conductive yoke of the first magnetic circuit of the first chain sensor. Likewise, the end of the lateral leg of the magnetically conductive yoke of the second magnetic circuit of the second chain sensor is oriented towards both a different chain link and a different part of a chain link than the end of the lateral leg of the magnetically conductive yoke of the first magnetic circuit of the second chain sensor. The distance between the two chain sensors is dimensioned such that the end of the lateral leg of the magnetically conductive yoke of the first chain sensor is oriented towards both a different chain link and a different part of a chain link than the end of the lateral leg of the magnetically conductive yoke of the second chain sensor. All of the lateral legs of the magnetic yokes of the two chain sensors are oriented towards different chain links of the chain to be monitored and, at the same time, towards different areas of a chain link. This arrangement provides both chain sensors with different signals of the changes in magnetic field strength caused by the chain to be monitored.

According to another aspect of the present invention, a method for determining an elongation of a chain during operation includes forming a first partially closed magnetic circuit, applying a voltage to a coil disposed in the magnetic circuit, generating an alternating magnetic flux density in the magnetic circuit as the chain moves through the partially closed magnetic circuit, detecting the alternating magnetic flux density in the magnetic circuit as a plurality of measured values by a device for detecting the magnetic flux density, and determining a length value of the chain from the measured values.

In accordance with the present invention, the method by which the elongation of a chain is determined during operation comprises five method steps: in the first step, a partially closed magnetic circuit is formed. The magnetic circuit comprises a magnetically conductive yoke body and the chain to be monitored. If the chain sensor according to the invention has a second magnetically conductive yoke body, the magnetic circuit is formed by the two yoke bodies and the chain to be monitored extending therebetween. The lateral leg of the magnetically conductive yoke body has a small distance from the chain to be monitored. In the second step, a voltage is applied to the electrically conductive coil located within the magnetic circuit. This creates a fluctuating magnetic field within the magnetic circuit. In the third step, the chain to be monitored, which is moved through the magnetic circuit, generates an alternating magnetic field within the magnetic circuit. Movement of the chain along the chain sensor also changes, with the transition from chain joint to gap, the path of the lowest magnetic resistance for the magnetic circuit, thus generating a magnetic field with alternating amplitudes. At the device for detecting the magnetic flux density, the magnetic field correspondingly alternates such that an alternating flux density is generated depending on the location and speed of the chain to be monitored. This alternating flux density is detected by the device for detecting the magnetic flux density in the form of measured values in the fourth step. In the fifth step, a length value of the chain to be monitored is determined from the measured values detected by the device for detecting the magnetic flux density.

A method according to the present invention for determining the elongation of a chain during operation requires a constant speed of the chain to be monitored. Irregularities in the drive system of the chain to be monitored, e.g., slip between drive and chain, result in inaccurate measurements and thus false elongation values of the chain to be monitored.

According to another advantageous feature of the present invention, the method to determine the elongation of a chain during operation can include a second magnetic circuit in addition to the first magnetic circuit. The second magnetic circuit comprises the magnetically conductive yoke body and the chain to be monitored. If the chain sensor according to the invention has a second magnetically conductive yoke body, the second magnetic circuit is formed by the two yoke bodies and the chain to be monitored extending therebetween. Like the first magnetic circuit, this second magnetic circuit is generated by an electrically conductive coil to which a voltage is applied. The magnetic flux density generated by the chain to be monitored moving along the chain sensor of the invention is detected. The elongation of the chain to be monitored is determined by this method using two magnetic circuits independently of the direction of movement and speed of the chain to be monitored.

For clear separation of the two magnetic circuits, the method to determine the elongation of a chain during operation can be configured such that a second electrically conductive coil is present in the second magnetic circuit, to which a voltage is applied, thus creating a second magnetic circuit. In addition, a second device for detecting the alternating magnetic flux density may be disposed in the second magnetic circuit, which detects the alternating magnetic flux density generated by the chain to be monitored. This structural separation of both magnetic circuits enables a safe transfer of the magnetic field lines of both magnetic circuits onto the chain links. Moreover, this arrangement prevents short-circuits between the chain to be monitored and the yoke body.

According to another advantageous feature of the present invention, the two magnetic circuits of the chain sensor can be disposed at a distance from each other. This distance may optionally be embodied according to equation (1). This distance is dimensioned such that both magnetic circuits are oriented towards different chain links of the chain to be monitored and, at the same time, towards different areas of a chain link. This arrangement provides both magnetic circuits with different signals of the changes in magnetic field strength caused by the chain to be monitored. Monitoring of the speed and direction of movement is possible in addition to monitoring the elongation of chain links.

According to another advantageous feature of the present invention, a third magnetic circuit can be provided in addition to the first and second magnetic circuits. The third magnetic circuit comprises the magnetically conductive yoke body and the chain to be monitored. If the chain sensor according to the invention has a second magnetically conductive yoke body, the third magnetic circuit is formed by the two yoke bodies and the chain to be monitored extending therebetween. Like the first and second magnetic circuits, this third magnetic circuit is generated by an electrically conductive coil to which a voltage is applied. The alternating magnetic flux density generated by the chain to be monitored moving along the chain sensor of the invention is detected. The elongation, speed and direction of movement as well as acceleration or deceleration of the chain to be monitored are determined.

According to another advantageous feature of the present invention, a third electrically conductive coil can be present in the third magnetic circuit, to which a voltage is applied, thus creating a third magnetic circuit. In addition, a third device for detecting the alternating magnetic flux density may be disposed in the third magnetic circuit, which detects the magnetic flux density generated by the chain to be monitored. This separation of the three magnetic circuits enables a safe transfer of the magnetic field lines of the three magnetic circuits onto the chain links. Moreover, this arrangement prevents short-circuits between the chain to be monitored and the yoke body.

According to another advantageous feature of the present invention, the three magnetic circuits of the chain sensor can be disposed at a distance from each other. This distance is dimensioned such that the three magnetic circuits are oriented towards different chain links of the chain to be monitored and, at the same time, towards different areas of a chain link. The distances between the first and second or first and third magnetic circuits may optionally be dimensioned according to equations (2) and (3). This arrangement provides the three magnetic circuits with different signals of the changes in magnetic field strength caused by the chain to be monitored. Monitoring the elongation of the chain links, speed and direction of movement as well as acceleration of the chain to be monitored is enabled by this arrangement with three magnetic circuits.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
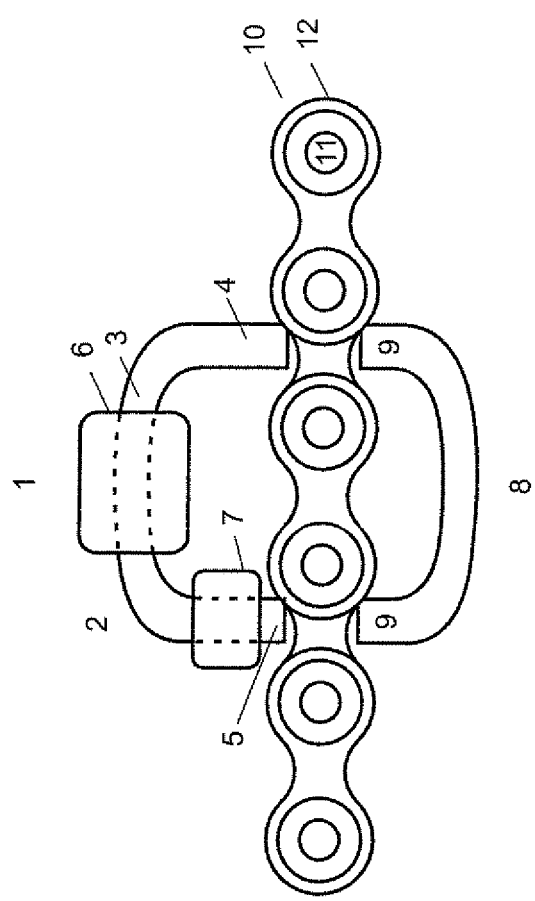
FIG. 1 shows a chain sensor with a partially closed magnetic circuit.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a chain sensor 1 which includes a magnetic circuit 2 formed by a first magnetically conductive yoke body 3 made of a magnetically conductive or magnetically permeable material, such as soft iron. In this exemplary embodiment, the magnetically conductive yoke body 3 has two lateral legs 4, 5. A device 6 for measuring the magnetic flux density is located at the central lateral leg of yoke body 3. Typically, this device is an inductive coil. At the end of the lateral legs, there is a further coil 7 for applying a voltage to magnetic circuit 2. The ends of yoke body 3 are disposed substantially perpendicularly to the central part at a small distance from a chain 10. The distance of lateral legs 4, 5 from each other corresponds to a multiple of the chain link length which is determined based on the distance of the centers of two adjacent pins, in this example, exactly two chain links of chain 10 to be monitored. Chain 10 to be monitored may be guided and moved contactlessly through chain sensor 1. A second magnetically conductive yoke body 8 is attached to the opposite side of chain 10 to be monitored, amplifying the measuring signal in case of a high magnetic resistance of chain 10. Here, ends 9 of the lateral legs of second yoke body 8 face the same positions of chain 10 as the ends of lateral legs 4, 5 of first yoke body 3. To determine the elongation of chain 10, a voltage, ideally a high-frequency alternating voltage, is applied to a coil 7. Chain 10 guided through chain sensor 1 at a constant speed generates different alternating magnetic fields depending on the position of chain 10, the frequency of which is lower than the alternating voltage applied to coil 7 by a factor of about 10. For example, if a chain pin 11 is between lateral legs 4, 5, 9, the magnetic resistance or reluctance of chain 10 is low and generates a high voltage in device 6 for measuring the magnetic flux density. If a chain gap is between lateral legs 4, 5, 9, the magnetic resistance of chain 10 is high and generates a low voltage in device 6 for measuring the magnetic flux density. In this manner, knowing the speed of chain 10, the length of each chain link 12 of chain 10 can be determined. In one variant of the chain sensor according to the invention, magnetically conductive yoke body 3 only has one except for a gap having a slightly larger width than the thickness of chain link 12, the end of which is disposed at a small distance from chain 10. In this case, yoke body 3 is perpendicular to the chain's direction of movement. This structure of chain sensor 1 is particularly compact and may also be retrofitted in confined spaces.

Figure 2:
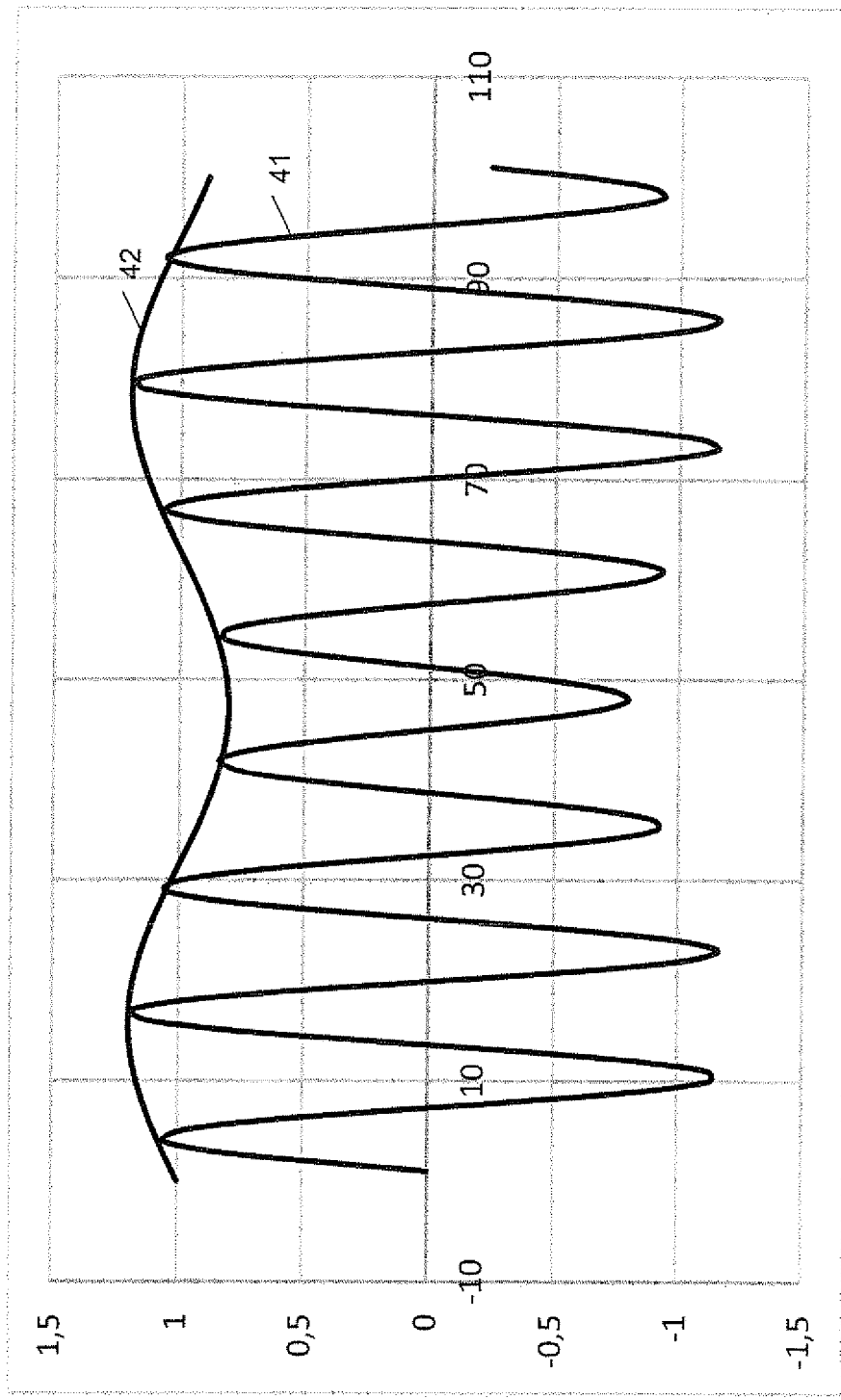
FIG. 2 shows a signal of the chain sensor of FIG. 1 with the chain running past it.

FIG. 2 shows a plot 40 as may, for example, be generated by a chain sensor 1 from the data determined by device 6 for measuring the magnetic flux density. The x-axis of plot 40 shows the time, the y-axis of plot 40 shows the magnetic flux density. Here, a curve 41 shows the measured values recorded by device 6 for measuring the magnetic flux density. A sinusoidal oscillation with fluctuating maximum amplitude can be seen. The fluctuation in the maximum amplitude of curve 41 is illustrated by an envelope 42. The maximum amplitude 42 increases when a magnetically conductive object, such as a chain pin 11, is located within the gaps between the ends of lateral legs 4, 5 of yoke body 3. The maximum amplitude decreases when there is currently no magnetically conductive object within the gaps between the ends of lateral legs 4, 5 of yoke body 3, such as the air between two neighboring chain bolts 11 upon chain 10 advancing. At a constant speed, the length of chain link 12 (the distance between two neighboring chain pins 11) may be determined from the distances of the maximums of the maximum amplitude. If chain links 12, such as in delivery state, have chain links 12 of the same length, the speed of chain 10 may be determined from the distances of the maximums of the maximum amplitude.

Figure 3:
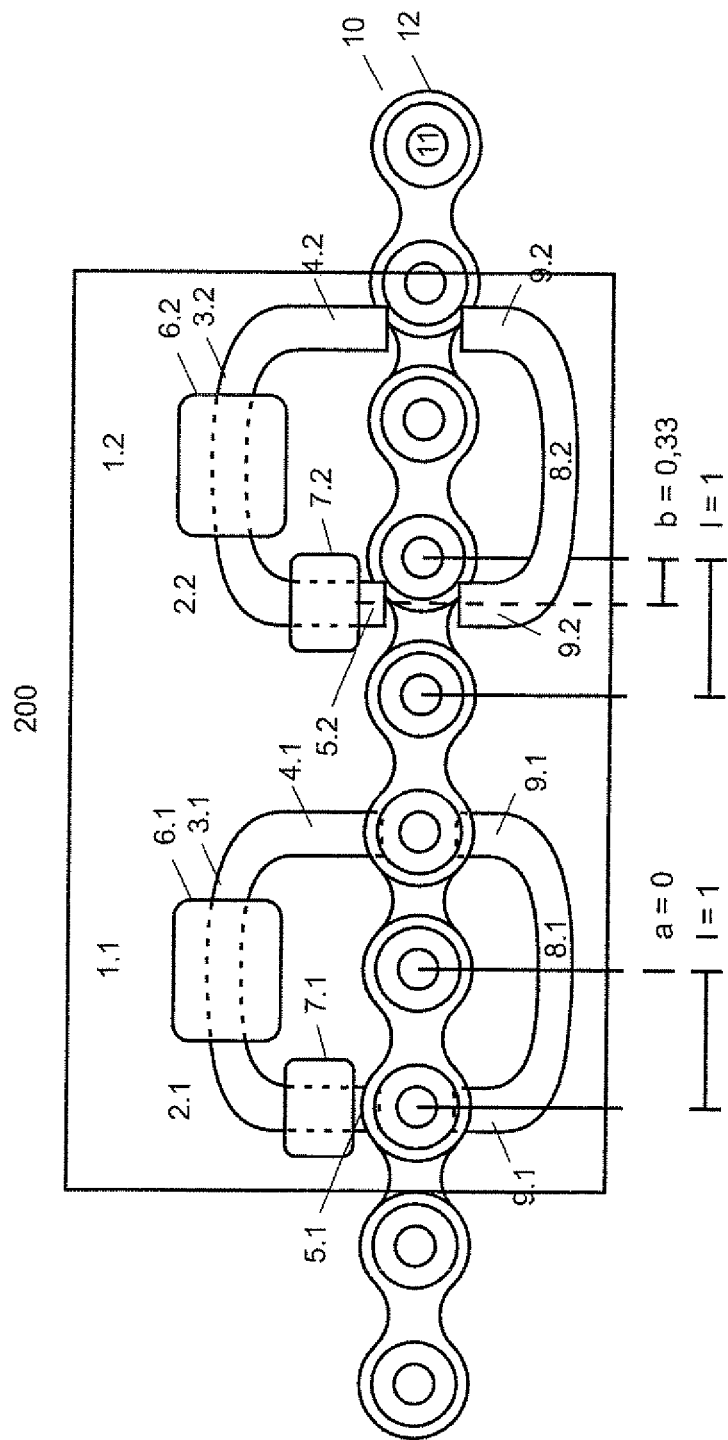
FIG. 3 shows a chain sensor with two partially closed magnetic circuits and four yoke bodies.

To detect the elongation of each chain link even at different speeds of chain 10 to be monitored, chain sensor 1 is operated with two magnetic circuits 2.1, 2.2 (FIG. 3). Like in the first exemplary embodiment (FIG. 1), the distances among lateral legs 4.1, 4.2, 5.1, 5.2 of each magnetically conductive yoke body 3.1, 3.2 are the length of two chain links 12. Yoke bodies 3.1, 3.2 of the two magnetic circuits 2.1, 2.1 are disposed at a distance from each other. The distance is dimensioned such that the end of lateral leg 4.2, 5.2 of magnetically conductive yoke 3.2 of the second magnetic circuit 2.2 is oriented towards both a different chain link 12 and a different part of a chain link 12 than the end of lateral leg 4.1, 5.1 of the magnetically conductive yoke 3.1 of the first magnetic circuit 2.1. In this exemplary embodiment, the second magnetically conductive yoke body 3.2 is offset from the first magnetically conductive yoke body 3.1 by an amount of 0.33 times the length of chain link 12. The same alternating voltage (same frequency and amplitude, phase shift 0) is applied to both coils 7.1, 7.2 present for applying a voltage to magnetic circuits 2.1, 2.2. If a chain pin 11 is between lateral legs 4.1, 5.1 of first magnetic circuit 2.1, the magnetic resistance or reluctance of chain 10 is low and generates a high voltage in device 6.1 for measuring the magnetic flux density of the first magnetic circuit. At the same time, the magnetic resistance between lateral legs 4.2, 5.2 of second magnetic circuit 2.2 is lower than in the first magnetic circuit 2.1. During the movement of the chain to be monitored through chain sensor 1, a characteristic voltage signal is generated in both devices 6.1, 6.2 for measuring the magnetic flux density.

Figure 4:
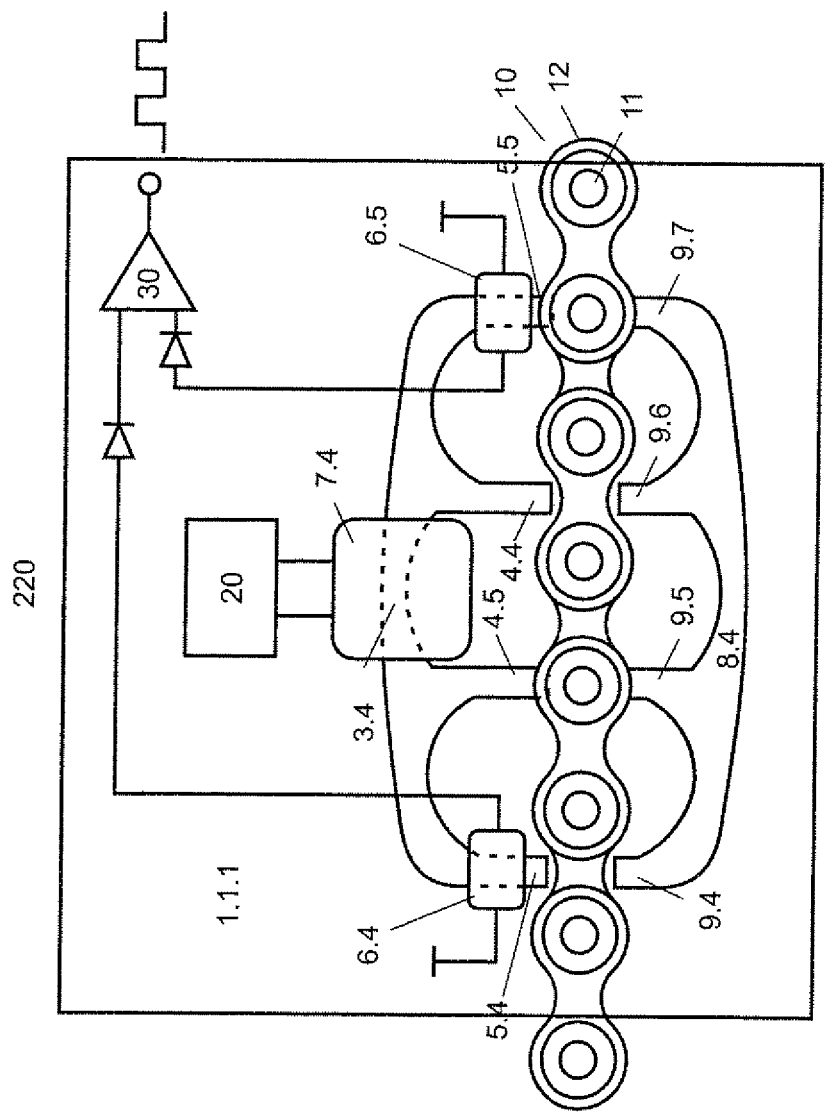
FIG. 4 shows a chain sensor with two partially closed magnetic circuits and two yoke bodies.

FIG. 4 shows a simple structure of chain sensor 220 according to the invention having two magnetic circuits. Chain sensor 220 comprises a two-part magnetically conductive yoke body having an upper part 3.4 and a lower part 8.4 disposed above and below chain 10 to be monitored perpendicularly to chain links 12. The first magnetic circuit is formed by lateral legs 4.4, 5.4, 9.4, 9.6 and the central leg of both yoke bodies 3.4, 8.4, the second magnetic circuit is formed by lateral legs 4.5, 5.5, 9.5, 9.7 and the central leg of both yoke bodies 3.4, 8.4. An alternating current is applied to both magnetic circuits by a coil 7.4. At yoke body 3.4 attached above chain 10, devices 6.4, 6.5 for measuring the magnetic flux density are located at lateral legs 5.4, 5.5. They are each connected to a comparator 30 through a diode. The comparator is used to convert the alternating voltage signals into square-wave signals. In this example, distance d of lateral legs 4.4, 5.4, 9.4, 9.6 of the first magnetic circuit from lateral legs 4.5, 5.5, 9.5, 9.7 of the second magnetic circuit is d=1*I+0.5*I, that is, 1.5 times the length of a chain link of chain 10 to be monitored. To determine the elongation of chain 10, a high-frequency alternating voltage is applied to coil 7.4. The distances of lateral legs 4.4, 4.5, 5.4, 5.5, 9.4, 9.5, 9.6, 9.7 of yoke body 3.4, 8.4 are dimensioned such that a magnetic circuit with the lowest magnetic resistance is generated in yoke body 3.4, 8.4 exactly when a chain pin 11 of chain 10 to be monitored is positioned between the four lateral legs 4.4, 5.4, 9.4, 9.6 of the first magnetic circuit or the four lateral legs 4.5, 5.5, 9.5, 9.7 of the second magnetic circuit. The respective other lateral legs are positioned above gaps of the chain links and are passed through by substantially no or a considerably lower magnetic flux. The movement of chain 10 to be monitored creates a fluctuating alternating magnetic field in devices 6.4, 6.5 for measuring the magnetic flux density, which is fed to a comparator. Comparator 30 compares the voltages coming from devices 6.4, 6.5 for measuring the magnetic flux density and outputs 1, e.g., if the amount of the voltage from coil 6.4 is larger than the amount of voltage from coil 6.5, or otherwise 0.

Figure 5:
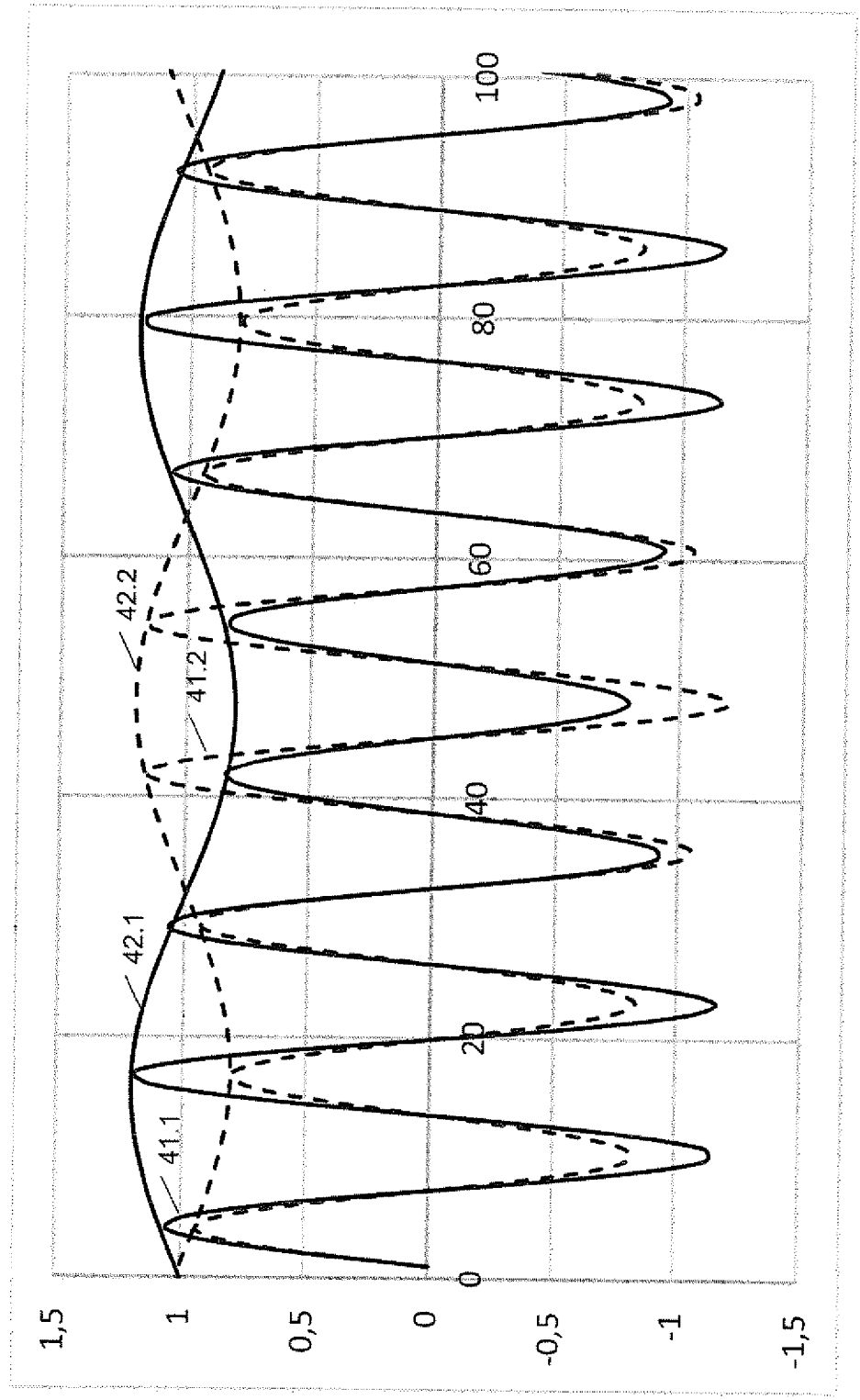
FIG. 5 shows a signal of the chain sensor of FIG. 4 with the chain running past it.

FIG. 5 shows a plot 40 as may, for example, be generated by a chain sensor 220 according to FIG. 4 from the data determined by device 6 for measuring the magnetic flux density. The x-axis of plot 40 shows the time, the y-axis of plot 40 shows the magnetic flux density. Here, curve 41.1 shows the measured values recorded by device 6.4 for measuring the magnetic flux density, curve 41.2 shows the measured values recorded by device 6.5 for measuring the magnetic flux density. Both curves 41.1, 41.2 show a sinusoidal oscillation of fluctuating maximum amplitude. The fluctuation in the maximum amplitude of curves 41.1, 41.2 is illustrated by envelopes 42.1, 42.2. The maximum amplitudes 42.1, 42.2 increase when a magnetically conductive object, such as a chain pin 11, is located within the gaps between the ends of lateral legs 4.4, 5.4, 9.4, 9.6 or between the ends of lateral legs 4.5, 5.5, 9.5, 9.7 of yoke bodies 3.4, 8.4. The maximum amplitude decreases when there is currently no magnetically conductive object within the gaps between the ends of lateral legs 4.4, 5.4, 9.4, 9.6 or between the ends of lateral legs 4.5, 5.5, 9.5, 9.7 of yoke bodies 3.4, 8.4, such as the air between two neighboring chain bolts 11 upon chain 10 advancing. The maximums of envelopes 42.1, 42.2 are offset from each other by half a wavelength of envelopes 42.1, 42.2.

Figure 6:
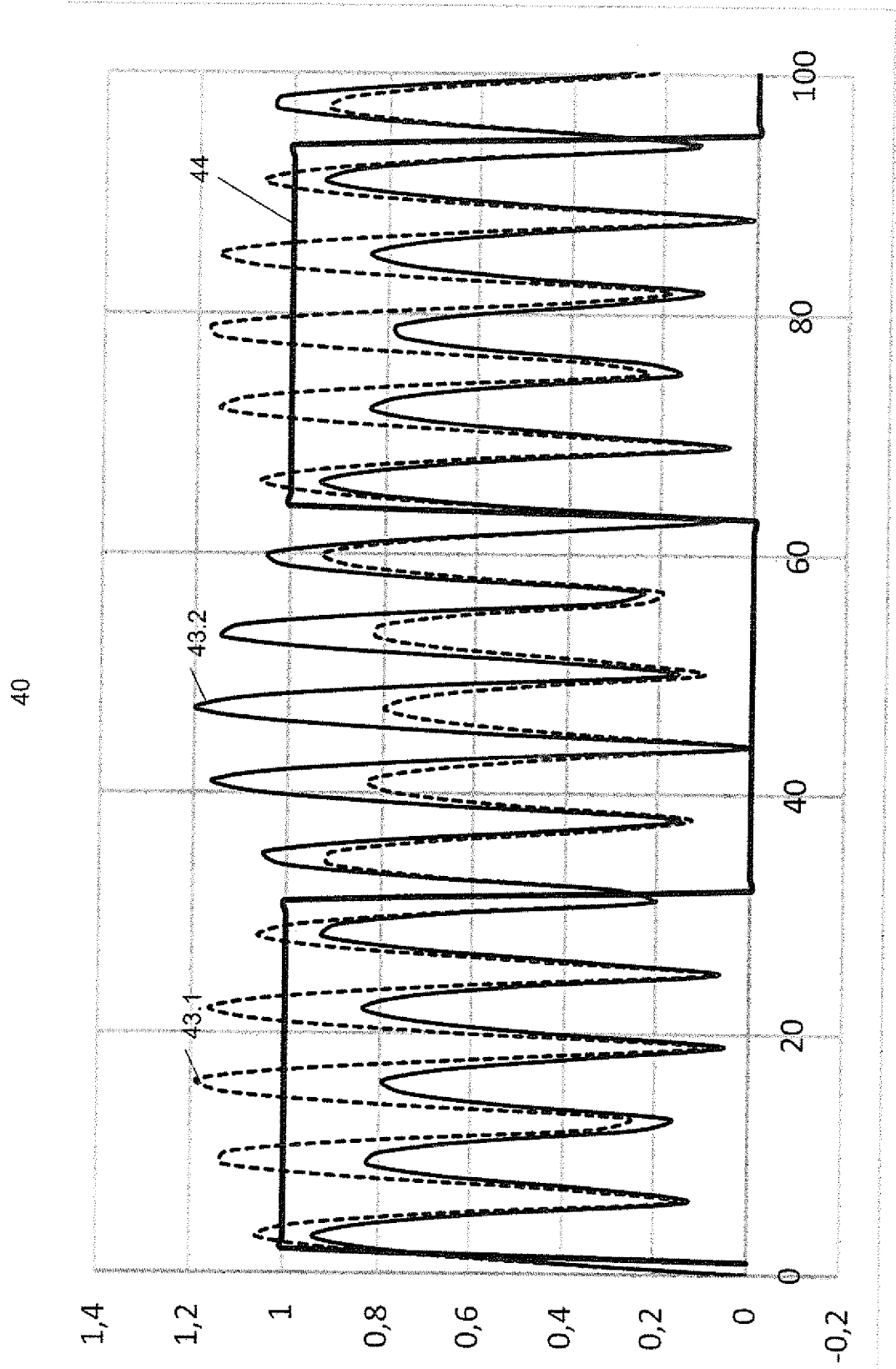
FIG. 6 shows the chain sensor of FIG. 5 with the chain running past it after comparison by a comparator.

FIG. 6 shows a plot 40 as may, for example, be generated by a chain sensor 220 according to FIG. 4 from the data determined by device 6 for measuring the magnetic flux density. The x-axis of plot 40 shows the time, the y-axis of plot 40 shows the magnetic flux density. Here, curve 43.1 shows the amounts of the measured values recorded by device 6.4 for measuring the magnetic flux density, curve 43.2 shows the amounts of the measured values recorded by device 6.5 for measuring the magnetic flux density. Both curves 43.1, 43.2 show a sinusoidal oscillation of fluctuating maximum amplitude. The maximum amplitudes of curves 43.1, 43.2 increase when a magnetically conductive object, such as a chain pin 11, is located within the gaps between the ends of lateral legs 4.4, 5.4, 9.4, 9.6 or between the ends of lateral legs 4.5, 5.5, 9.5, 9.7 of yoke bodies 3.4, 8.4. The maximum amplitude decreases when there is currently no magnetically conductive object within the gaps between the ends of lateral legs 4.4, 5.4, 9.4, 9.6 or between the ends of lateral legs 4.5, 5.5, 9.5, 9.7 of yoke bodies 3.4, 8.4, such as the air between two neighboring chain bolts 11 upon chain 10 advancing. Comparator 30 calculates the difference of the amounts of the measured values recorded by devices 6.4, 6.5 for measuring the magnetic flux density, the result of which is shown in curve 44 of plot 40.

A structure of chain sensor 300 according to the invention with three magnetic circuits 2.1, 2.2, 2.3 (FIG. 7) does not only allow to determine the elongation of each chain link 12, the speed and direction of movement of chain 10 to be monitored, but also its acceleration, e.g. upon starting or slowing down chain 10. The distances among lateral legs 4.1, 5.1, 4.2, 5.2, 4.3, 5.3 of each magnetically conductive yoke body 3.1, 3.2, 3.3 are the length of two chain links 12 each. Yoke bodies 3.1, 3.2, 3.3 of the three magnetic circuits 2.1. 2.2, 2.3 are disposed at a distance d from each other. The distance is dimensioned such that the respective ends of lateral legs 4.1, 5.1, 4.2, 5.2, 4.3, 5.3 of the individual magnetically conductive yokes 3.1, 3.2, 3.3 of the three magnetic circuits 2.1, 2.2, 2.3 are oriented towards both a different chain link 12 and a different part of a chain link 12. In this exemplary embodiment, the second magnetically conductive yoke body 3.2 is offset from the first magnetically conductive yoke body 3.1 by an amount of 0.25 times the length of a chain link 12, the third magnetically conductive yoke body 3.3 is offset from the first magnetically conductive yoke body 3.1 by an amount of 0.33 times the length of a chain link 12. When applying the same alternating current to the three coils 7.1, 7.2, 7.3 for applying a voltage to magnetic circuits 2.1, 2.2, 2.3, the magnetic resistance of the three magnetic circuits 2.1, 2.2, 2.3 has different values at the same frequency depending on the movement of chain 12.

Figure 7:
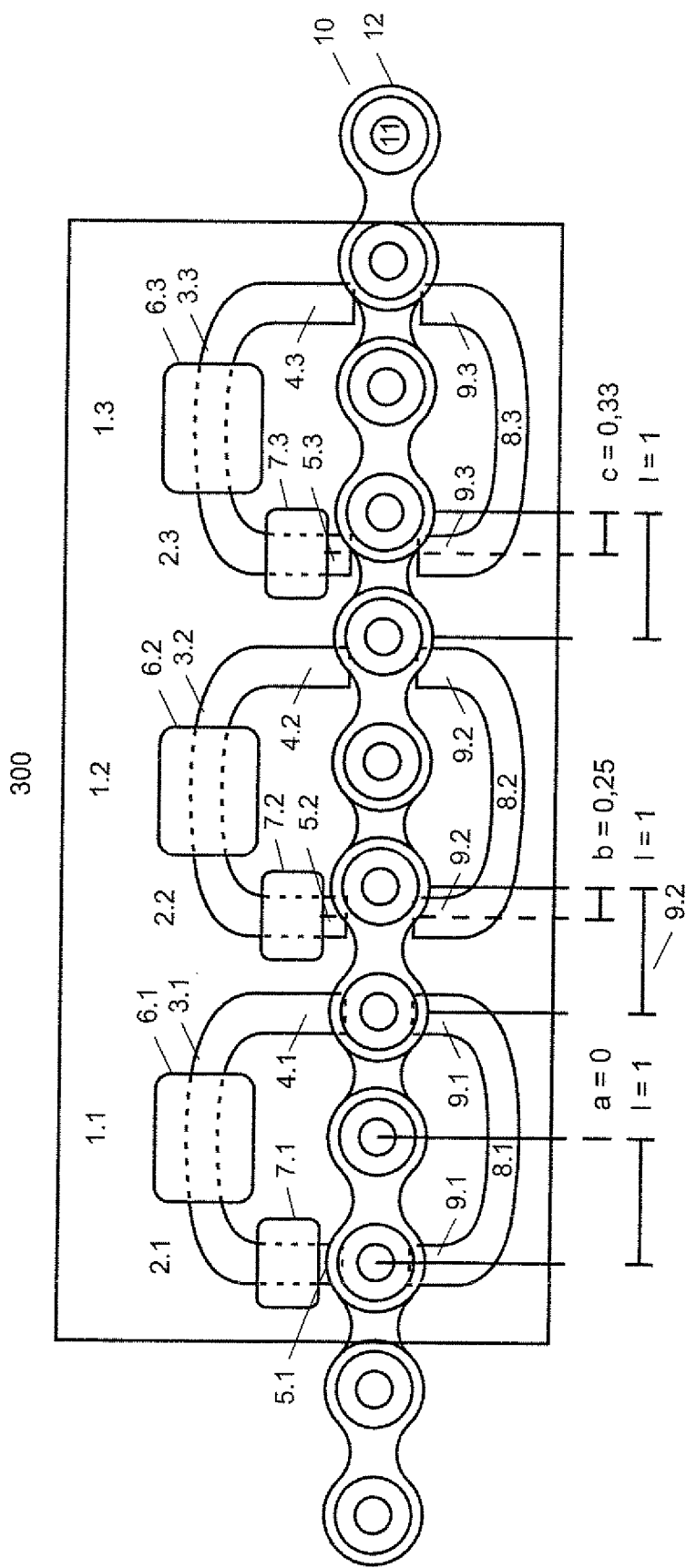
FIG. 7 shows a chain sensor with three partially closed magnetic circuits and six yoke bodies.
Figure 8:
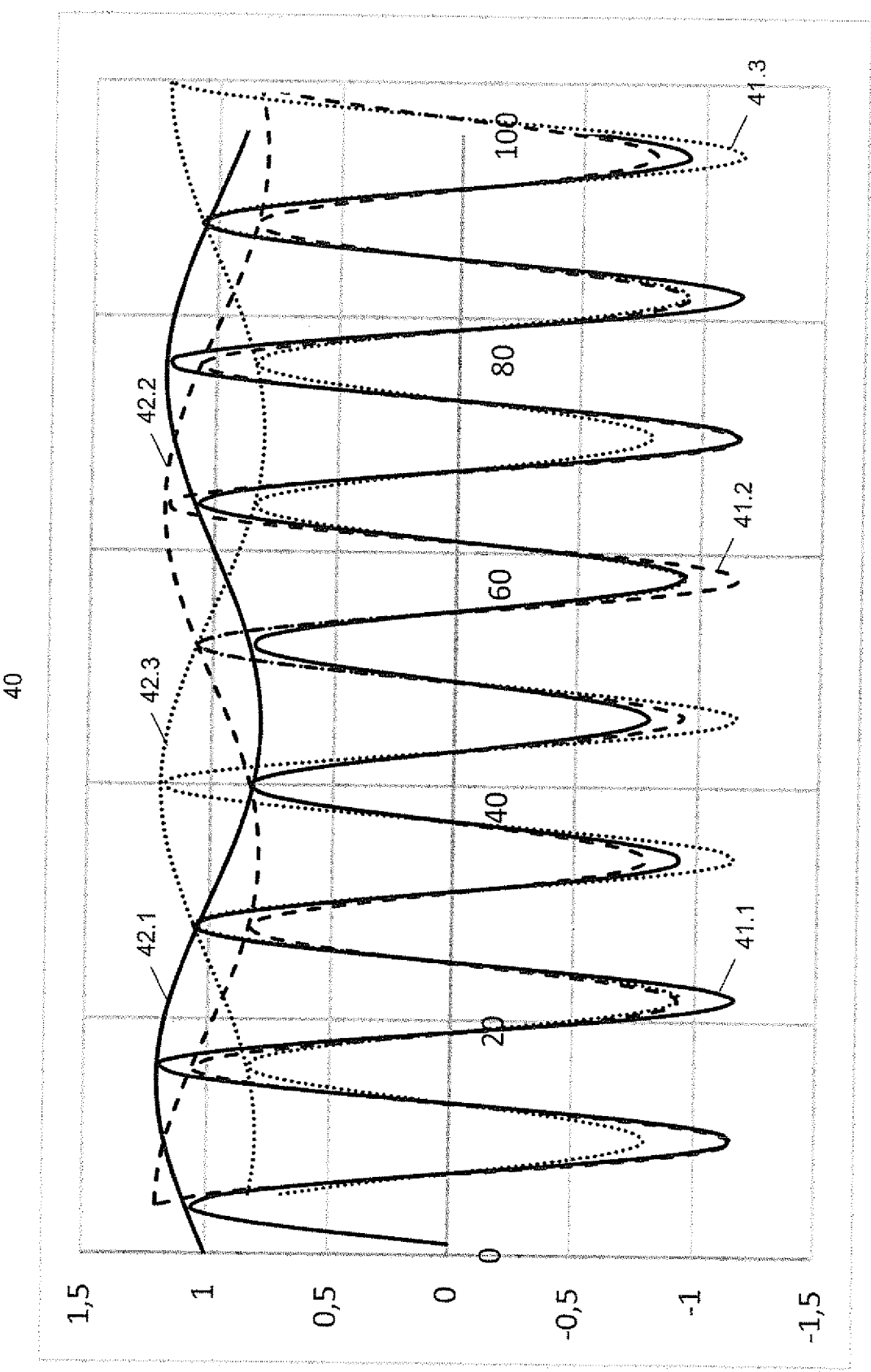
FIG. 8 shows a signal of the chain sensor of FIG. 5 with the chain running past it.

FIG. 8 shows a plot 40 as may, for example, be generated by a chain sensor 300 according to FIG. 7 from the data determined by devices 6.1, 6.2, 6.3 for measuring the magnetic flux density. The x-axis of plot 40 shows the time, the y-axis of plot 40 shows the magnetic flux density. Here, curve 41.1 shows the amounts of the measured values recorded by device 6.1 for measuring the magnetic flux density, curve 41.2 shows the amounts of the measured values recorded by device 6.2 for measuring the magnetic flux density, and curve 41.3 shows the amounts of the measured values recorded by device 6.3 for measuring the magnetic flux density. All curves 41.1, 41.2, 41.3 show a sinusoidal oscillation of fluctuating maximum amplitude. The maximum amplitudes of the curves are shown by envelopes 42.1, 42.2, 42.3. They increase when a magnetically conductive object, such as a chain pin 11, is located within the gaps between the ends of lateral legs 4.1, 5.1, 9.1, forming the first magnetic circuit 2.1, or between the ends of lateral legs 4.2, 5.2, 9.2, forming the second magnetic circuit 2.2, or between the those of lateral legs 4.3, 5.3, 9.3, forming the third magnetic circuit 2.3, of the respective yoke bodies 3.1, 8.1 or 3.2, 8.2 or 3.3, 8.3, respectively. The maximum amplitude decreases when there is currently no magnetically conductive object within the gaps between the ends of lateral legs 4.1, 4.2, 4.3, 5.1, 5.2, 5.3, 9.1, 9.2, 9.3 of yoke bodies 3.1, 3.2, 3.3, 8.1, 8.2, 8.3, such as the air between two neighboring chain bolts 11 upon chain 10 advancing. The maximum amplitudes of the measured values recorded by devices 6.1, 6.2, 6.3 for measuring the magnetic flux density are shown by curves 42.1, 42.3, 42.3. Their maximums are offset in time corresponding to the distances of the individual yoke bodies 3.1, 3.2, 3.3 forming magnetic circuits 2.1, 2.2, 2.3.

Figure 9:
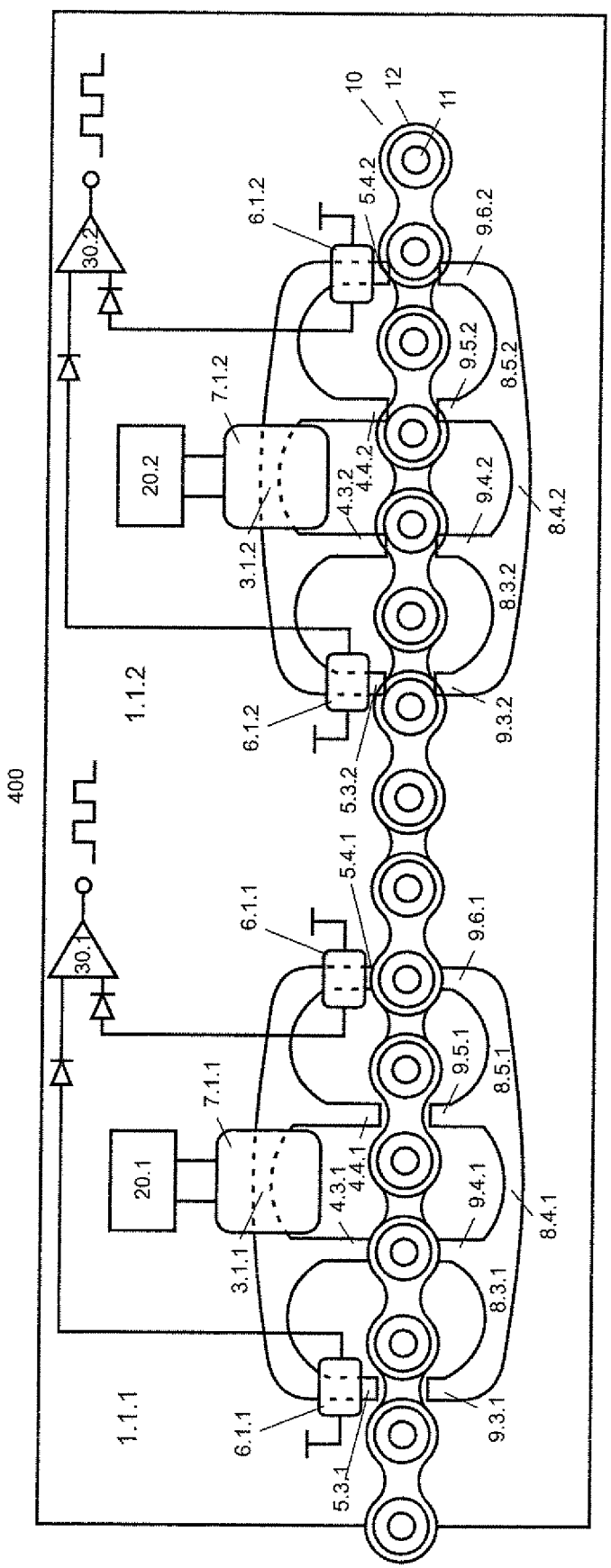
FIG. 9 shows a chain sensor with four partially closed magnetic circuits and four yoke bodies.

FIG. 9 shows another structure of a chain sensor 400 according to the invention, having four magnetic circuits and four magnetically conductive yoke bodies 3.1.1, 3.1.2, 8.4.1, 8.4.2, basically consisting of two chain sensors and corresponding to a doubling of the exemplary embodiment as shown in FIG. 4. Here, the individual chain sensors according to the exemplary embodiment of FIG. 4 each comprise a coil 7.1.1, 7.1.2 connected to a voltage source 20.1, 20.2 for applying an alternating current to the magnetic circuits, devices 6.1.1, 6.1.2, 6.2.1, 6.2.2 for measuring the magnetic flux density in the individual magnetic circuits, and two yoke bodies 3.1.1, 3.1.2, 8.4.1, 8.4.2 each made of a magnetically conductive material. Devices 6.1.1, 6.1.2, 6.2.1, 6.2.2 for measuring the magnetic flux density of both chain sensors according to the exemplary embodiment of FIG. 4 are each connected to a comparator 30.1, 30.2 through diodes. Yoke bodies 3.1.1, 3.1.2, 8.4.1, 8.4.2 are disposed at a distance from each other such that the respective ends of lateral leg 4.3.1, 5.3.1, 4.4.1, 4.4.2 of magnetically conductive yoke 3.1.1 of the first chain sensor are oriented towards chain pins or holes, the respective ends of lateral leg 4.3.2, 4.4.2, 5.3.2, 5.4.2 of magnetically conductive yoke 3.1.2 of the second chain sensor towards another area. This arrangement creates larger signal strengths and a greater accuracy than the use of a single chain sensor having two magnetic circuits. In addition, the second chain sensor may be used as a possibility to check individual measurement results based on the redundancy achieved.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A chain sensor device, comprising a first chain sensor, said chain sensor comprising: a first magnetic circuit including a first segment formed by a magnetically conductive yoke body which has a lateral leg, said lateral leg having an end for arrangement in a proximity of a chain; a device configured to measure a magnetic flux density in the first magnetic circuit and connected to an analysis unit; a coil arranged at the end of the lateral leg for applying a voltage to the first magnetic circuit; a second magnetic circuit positioned at a distance to the first magnetic circuit on a chain, wherein the end of the lateral leg of the magnetically conductive yoke body of the first magnetic circuit is disposed at a distance from an end of a lateral leg of a magnetically conductive yoke body of the second magnetic circuit, the distance being $d=n*g+\Delta$ wherein d is the distance n is an integer, g is a length of a chain link, and $\Delta>0.1*g$, preferably $\Delta>0.2*g$ and more preferably $\Delta>0.3*g$.

2. The chain sensor device of claim 1, wherein the coil has a terminal provided for applying an electrical voltage to the coil.

3. The chain sensor device of claim 1, wherein the magnetically conductive yoke body has a central leg and two of said lateral leg.

4. The chain sensor device of claim 1, wherein the second magnetic circuit has a device for measuring the magnetic flux density, and a first coil having a terminal for applying an electrical voltage to the coil.

5. The chain sensor device of claim 4, wherein the second magnetic circuit includes a magnetically conductive yoke and a second coil which is disposed at a lateral leg of the magnetically conductive yoke, said second coil having a terminal for applying an electrical voltage to the second coil.

6. The chain sensor device of claim 1 wherein the chain sensor comprises a third magnetic circuit positioned at a distance to the second magnetic circuit on the chain.

7. The chain sensor device of claim 6, wherein the third magnetic circuit includes a device for measuring the magnetic flux density, and a coil having a terminal for applying an electrical voltage to the coil.

8. The chain sensor device of claim 6, wherein the end of the lateral leg of the magnetically conductive yoke of the first magnetic circuit is disposed at a distance from an end of a lateral leg of a magnetically conductive yoke of the second magnetic circuit, the distance being $d_1=n_1*g+\Delta_1$ with $d_1$ being the distance, $n_1$ being an integer, g being a length of a chain link, and $\Delta,>0.1*g$, preferably $\Delta_1>0.2*g$ and more preferably $\Delta_1>0.3*g$, and wherein the end of the lateral leg of the magnetically conductive yoke of the first magnetic circuit is disposed at a distance from an end of a lateral leg of a magnetically conductive yoke of the third magnetic circuit, the distance $d_2$ being $d_2=n_2*g+\Delta_2$ with $d_2$ being the distance, $n_2$ being an integer, g being the length of a chain link, and $\Delta_2>0.1*g$, preferably $\Delta_2>0.2*g$ and more preferably $\Delta_2>0.3*g$, wherein $\Delta_1 \ne \Delta_2$.

9. The chain sensor device of claim 6, wherein the third magnetic circuit includes a coil disposed at a magnetically conductive yoke of the third magnetic circuit, said coil having a terminal for applying an electrical voltage to the coil.

10. The chain sensor device of claim 1, further comprising a second of said first chain sensor, said chain sensors positioned at a distance to one another upon the chain.

11. The chain sensor device of claim 10, wherein the end of the lateral leg of the magnetically conductive yoke body or the first magnetic circuit of the first chain sensor is disposed at a distance from an end of a lateral leg of a magnetically conductive yoke body of the second magnetic circuit of the first chain sensor, the distance being $d_1=n_1*g+\Delta_1$ with $d_1$ being the distance, n1 being an integer, g being a length of a chain link, and $\Delta_1>0.1*g$, preferably $\Delta,>0.2*g$ and more preferably $\Delta,>0.3*g$, and wherein the end of the lateral leg of the magnetically conductive yoke of the first chain sensor is disposed at a distance from an end of a lateral leg of a magnetically conductive yoke body of the second chain sensor, the distance being $d_k=n_k*g+\Delta_k$ with $d_k$ being the distance, $n_k$ being an integer, g being a length of a chain link, and $\Delta_k>0.1*9$, preferably $\Delta_k>0.2*g$ and more preferably $\Delta_k>0.3*g$, wherein $\Delta_1 \ne \Delta_k$.

12. A method for determining an elongation of a chain during operation, said method comprising: forming a first partially closed magnetic circuit; applying a voltage to a coil disposed in the magnetic circuit; generating an alternating magnetic flux density in the magnetic circuit as the chain moves through the partially closed magnetic circuit; detecting the alternating magnetic flux density in the magnetic circuit as a plurality of measured values by a device for detecting the magnetic flux density; determining a length value of the chain from the measured values; forming a second partially closed magnetic circuit; applying a voltage to the second magnetic circuit via a coil disposed in the second magnetic circuit; and detecting an alternating magnetic flux density generated in the second magnetic circuit as the chain moves through the second partially closed magnetic circuit, wherein the first magnetic circuit has a distance from the second magnetic circuit, wherein $d=n*g+\Delta$ with d being the distance, n being an integer, g being a length of a chain link, and $\Delta>0.1*1$, preferably $\Delta>0.2*1$ and more preferably $\Delta>0.3*1$.

13. The method of claim 12, wherein the applying of the voltage via the coil disposed in the second magnetic circuit and/or the detecting of the alternating magnetic flux density by a second device for detecting the alternating magnetic flux density disposed in the second magnetic circuit is accomplished in the second magnetic circuit.

14. The method of claim 12, further comprising: forming a third partially closed magnetic circuit; applying a voltage to the third magnetic circuit via a coil disposed in the third magnetic circuit; and detecting an alternating magnetic flux density generated in the third magnetic circuit as the chain moves through the third magnetic circuit.

15. The method of claim 14, wherein the applying of the voltage via the coil disposed in the third magnetic circuit and/or the detecting of the alternating magnetic flux density by a device for detecting the alternating magnetic flux density disposed in the third magnetic circuit is accomplished in the third magnetic circuit.

16. The method of claim 14, wherein the first magnetic circuit has a first distance from the second magnetic circuit, wherein $d_1=n_1*g+\Delta_1$ wherein the first magnetic circuit has a second distance from the third magnetic circuit, wherein $d_2=n_2*g+\Delta_2$ with $d_1$, $d_2$ being the first and second distances, respectively, $n_2$, $n_2$ being an integer, g being a length of a chain link, and $\Delta_1$, $\Delta_2>0.1*g$, preferably $\Delta_1$, $\Delta_2>0.2*g$ and more preferably $\Delta_1$, $\Delta_2>0.3*g$ and wherein $\Delta_1-\Delta_2$.

* * * * *